Oct. 19, 1937.

INVENTOR
C.W. HANSELL
BY
ATTORNEY

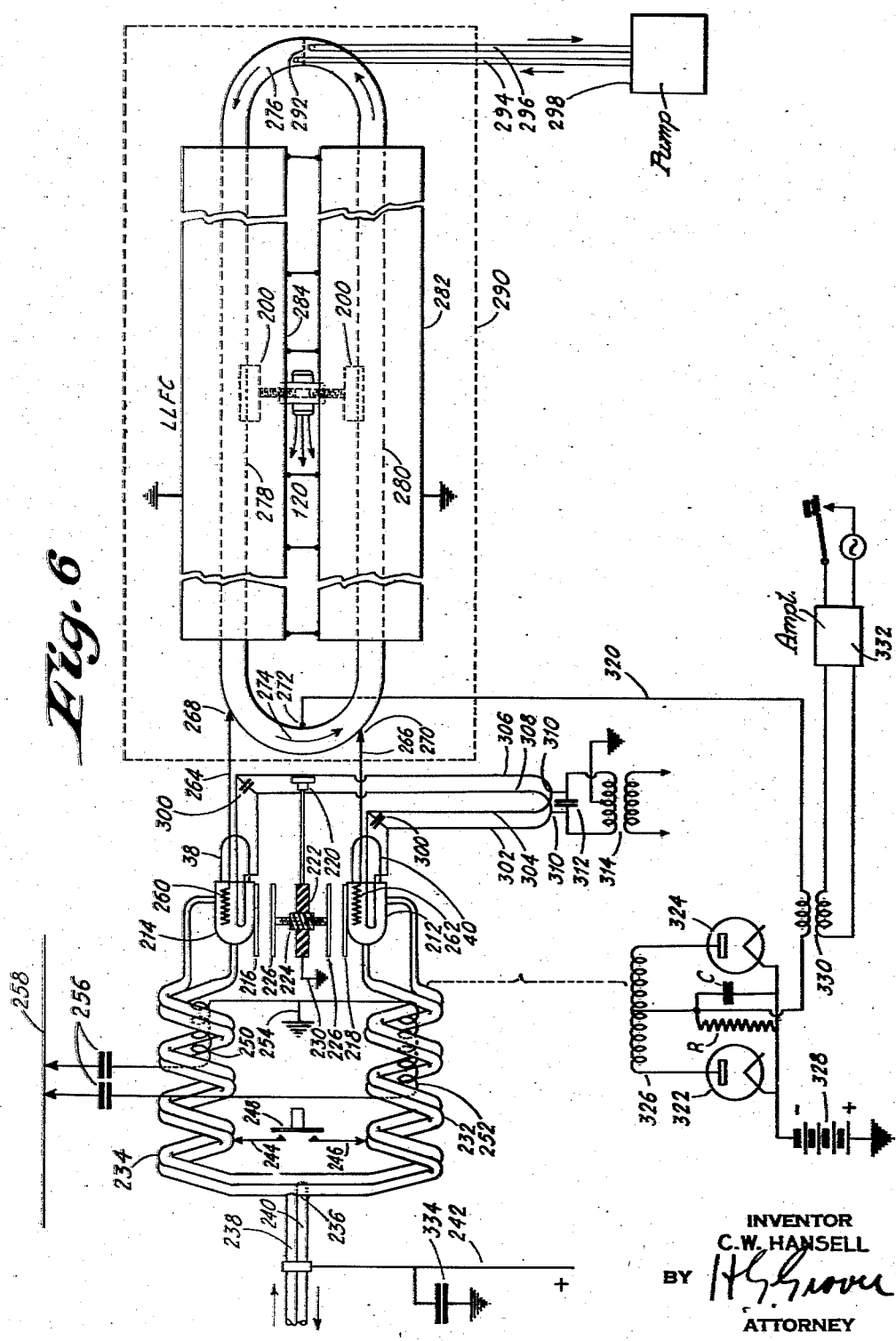

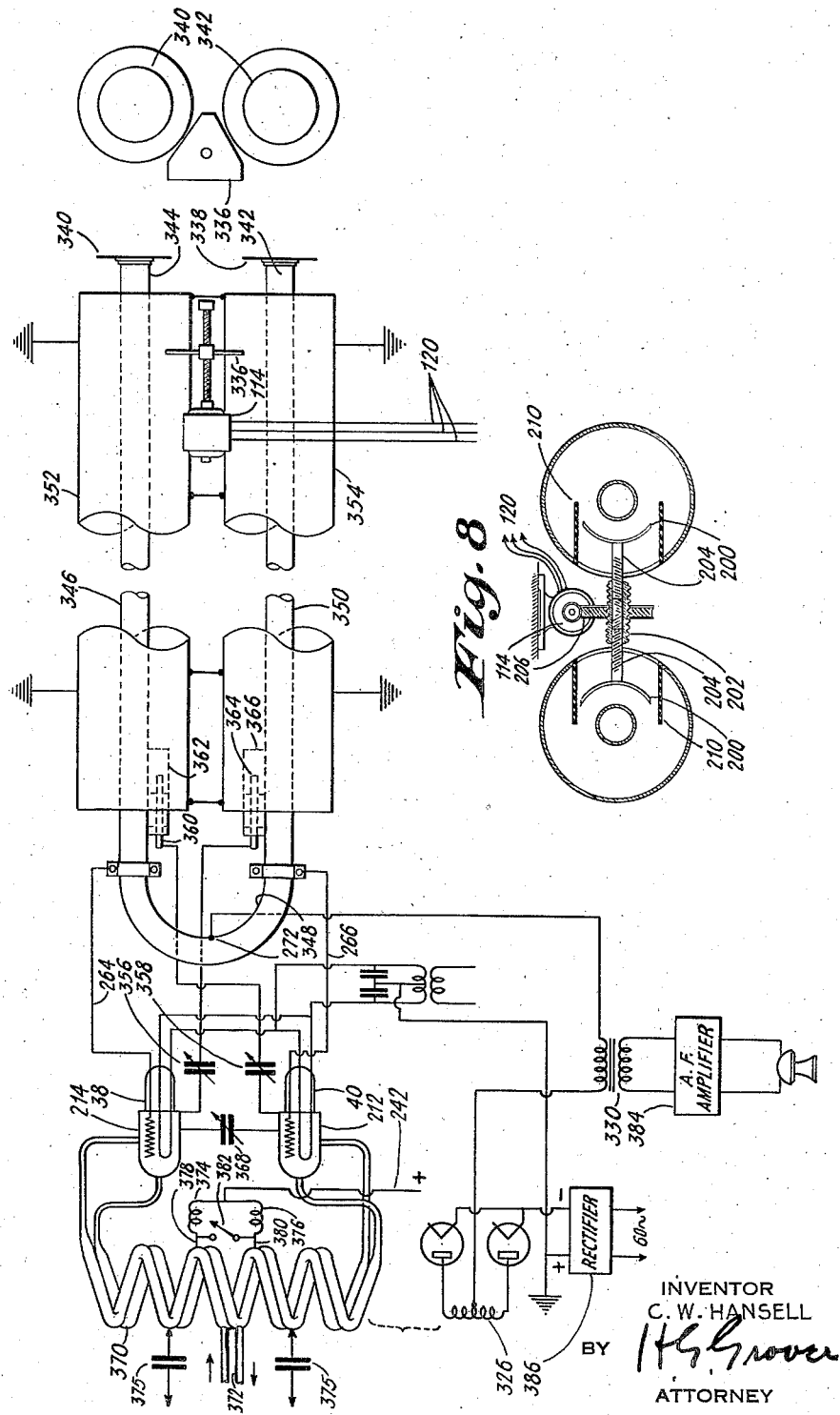

Patented Oct. 19, 1937

2,095,980

UNITED STATES PATENT OFFICE 2,095,980

OSCILLATION GENERATION AND CONTROL

Clarence W. Hansell, Port Jefferson, N. Y., assignor to Radio Corporation of America, a corporation of Delaware Application October 4, 1933, Serial No. 692,092

33 Claims. (Cl. 250—36)

My present invention relates to the production and control of high powered short waves of constant frequency.

In my United States Patent No. 1,945,546, granted February 6, 1934, there is disclosed an improved system for producing constant frequency oscillations. In general the system therein presented comprises an electron discharge device in combination with a rough frequency determining circuit and an accurate frequency determining and stabilizing circuit. The circuit of higher accuracy in frequency is formed of a pair of spaced conductors having appreciable length relative to the working wave-length and having uniformly distributed inductance and capacity. The conductors moreover are preferably linear and arranged parallel to each other. As explained more fully in my patent, standing waves produced upon the conductors serve to lock the oscillations generated by the device or devices, as the case might be, into step therewith, and as the standing waves are determined in frequency solely by the linear dimension of the line, high frequency stability is obtained. My present invention deals with a similar arrangement but has as its aim the provision of an improved line controlled system which is particularly applicable for short waves and which shall be simple and inexpensive in construction and highly efficient in operation.

For high efficiency in the operation of my present line controlled system and for economy in the construction thereof I prefer to make the line controlling circuit in the form of concentric tubes whose diameter ratios have certain definite values to be given more fully hereinafter. Moreover, an especially important purpose of my present invention is to provide an improved line construction for use with pushpull connected multi-electrode devices. To that end my present invention contemplates a U-shaped tubular construction over the legs of which, and insulatingly arranged therefrom, are placed metallic cylinders. The U-shaped controlling line is made, preferably, to have an overall length of some multiple of a half wavelength and for most practical purposes I prefer to make the overall dimension one-half wavelength taken at the desired operating frequency. However, if we consider the two sides of the U to be opposite sides of a two conductor or balanced transmission line then the length of each side is made a quarter wave or multiples of a quarter wave. My present invention also takes within its view the provision of approximately elliptical tubular lines for frequency control, the construction of which, as well as the more detailed construction of my U-shaped lines, is based upon principles more fully set forth hereinafter.

While my improved line controlled system is accurate with respect to frequency control and simple in construction, operation and maintenance, it is not completely infallible and occasionally permits of small drifts in frequency. A further object of my present invention is, therefore, to provide means both automatic and manual to adjust the effective length of my line controlling system whereby the frequency of operation is adjusted to a desired value.

For automatic frequency control it has been proposed heretofore to beat a controllable frequency source against a constant frequency source. The resultant frequency differentiated beat is passed through two filters in such a way that if the beat, and consequently the controllable frequency, is of correct value, no potential difference will arise across the filter circuits. However, if the beat shifts in frequency, the potential difference across the filters is utilized to vary the frequency of the controllable oscillator so that the oscillator is shifted in frequency in such a way as to produce the desired beat. This system, however, suffers from the disadvantage that it is liable to produce the correct beat frequency note when the controllable oscillator is either above or below the desired frequency by the same amount. Consequently, with such an arrangement, confusion is likely to ensue since an operator cannot readily tell, with such an arrangement, whether or not he is operating above or below his constant frequency comparing wave. Therefore, a further object of my present invention is to provide a frequency correcting and controlling system which shall have only one possible frequency of operation.

In carrying out this angle of my present invention I have discovered that the beat between waves of nearly the same frequency reverses in polarity or phase as the waves are passed through zero beat. This reversal of phase of the beat between energies of nearly like frequency as they are passed through zero beat is utilized to adjust the frequency of a controllable oscillator so as to bring it back in frequency to correspond to that of a highly constant frequency wave.

While my present improved frequency controlling system has been illustrated and described as correcting the frequency of a line controlled transmitter, or oscillation generator, it should be clearly understood that it is not limited thereto but may be applied as well to other forms of generators such as crystal controlled generators or simple regenerative oscillation generators or even to generators of electrical current of industrial frequencies.

In connection with the frequency control of an oscillation generator it is to be noted that a certain amount of leeway is permissible and in fact it is desirable that an oscillation generator be not corrected in frequency for every slight change which may occur since this would tend to subject the correcting apparatus to incessant operation with its concomitant undue wear. A further feature of my improved frequency controlling system resides in the provision of an arrangement which does not become operative to exercise its frequency control until a drift in frequency of a predetermined amount has taken place.

Some other objects of my present invention are to provide improved systems for rendering oscillation generators less liable to variation in frequency due to changes in temperature and vibration of their buildings or supports, to provide improved fluid cooled short wave systems, and to provide improved ways and means for varying the effective lengths of the line of line controlled oscillation generators. Other objects and advantages of my present invention will appear as the more detailed description is given by making special reference to the accompanying drawings wherein, generally, Figures 1a and 1b are, respectively, the top plan view and the side elevation view of an improved resonant line frequency controlled short wave transmitter employing many features of my present invention;

Figure 6 is a modification of my improved line frequency controlled transmitter especially adapted for shorter waves;

Figure 7 is a further modified form of line controlled transmitter for short waves incorporating therein a modulating system especially adapted therefor; and, Figure 8 illustrates an arrangement for adjusting the effective electrical length of my resonant frequency control line system.

Figure 1:
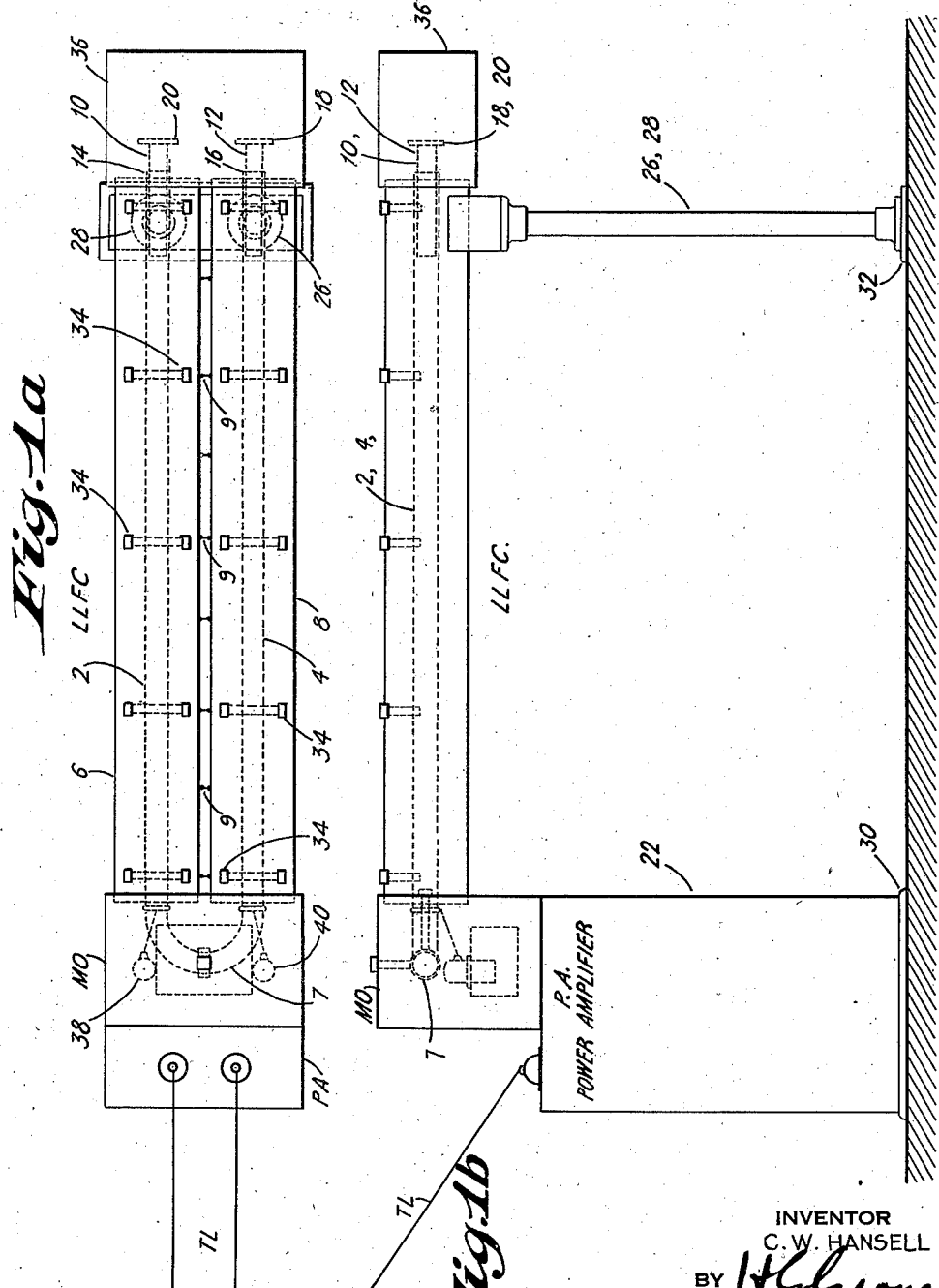

Turning to Figures 1a and 1b, one form of my improved line frequency control transmitter is seen to include a pushpull master oscillator stage MO mounted vertically above a final power amplifier stage PA in turn feeding energy through transmission lines TL to an antenna not shown but preferably of the type described by P. S. Carter in his United States Patent No. 1,974,387, granted September 18, 1934. The power amplifier PA is preferably of the water cooled pushpull type such as described by H. E. Hallborg in United States Patent No. 1,963,131, granted June 19, 1934.

The master oscillator MO is provided with a long line LLFC for frequency control. The line may be arranged and supported horizontally as shown, it may be supported vertically, or it may be placed at any angle to the horizontal.

The line for frequency control consists of a U-shaped pipe having two legs 2, 4, and a trough, bent, curved or bottom portion 7. The legs 2, 4 are within the outside pipes or tubes 6, 8. The inside transmission line 2, 4, 7 may be made entirely of copper or of a bent piece of iron pipe covered or plated with copper, silver, gold or other low resistance material. It may also be constructed of material having a very low temperature coefficient of linear expansion, such as iron-nickel alloy over which has been applied a coating of low resistance material. At extremely high frequencies where the line dimensions are relatively small other core materials such as fused quartz, pyrex glass, porcelain, etc., may be used as core materials in order to obtain a low overall temperature coefficient of expansion. Additional adjustable tube sections 10, 12 may be inserted or telescoped into the free electrical ends 14, 16 of the transmission line or U-shaped member 2, 4, 7. The tubes 10, 12 serve the purpose of adjusting the tubes to exact frequency as do also the metal disks 18, 20 placed over the telescoped pipes 10, 12, the disks 18, 20 being preferably slidable over the tubes 10, 12. By suitably dimensioning the disks or condenser plates 20, 18, variations in length of the long line, due to changes in ambient temperature or due to temperature rise from radio frequency losses, will cause an accompanying movement of the disks or condenser plates which may be made to vary the capacity between them and ground or the end of the box 36, so as to compensate for the changes in length of the long line and hence hold frequency constant. Because the open ends of the line and condenser plates 18, 20 fluctuate at high potentials, it is preferred that they be enclosed within a shielding box 36 which may be mounted as shown upon the outer metallic pipes 6, 8, or if desired may be carried by the line supporting pedestals 26, 28.

The inner conductors 2, 4, 7 of the line frequency control system is supported within the outer piping 6, 8 and held rigidly in position by "Isolantite" or "Mycalex" insulators 34. Also, the inside pipe 2, 4, 7 is preferably filled with sand, rosin, lead, concrete or other material to reduce its natural period of vibration and to absorb vibration so that the electrical resonant frequency of the system will be more nearly constant. The outer tubes 6, 8 are connected together and to ground by spacers, clamps or conductors 9.

The power amplifier unit includes, naturally, a metal casing which houses and shields the various elements therein as well as supports the shielded master oscillator MO. The power amplifier casing 22 may be loaded at its base with concrete, lead or sand if found desirable to further reduce tendency to vibration. Also, beneath the power amplifier casing 22 as well as beneath the pedestal supports 26, 28, which are preferably of metallic piping and filled with sand or concrete, there is placed vibration absorbing material 30, 32 such as rubber, wood fiber or felt. As a consequence any tendency of the building to vibrate will be first damped by the vibration absorption material before being transferred in reduced form to the oscillator apparatus.

Figure 2:
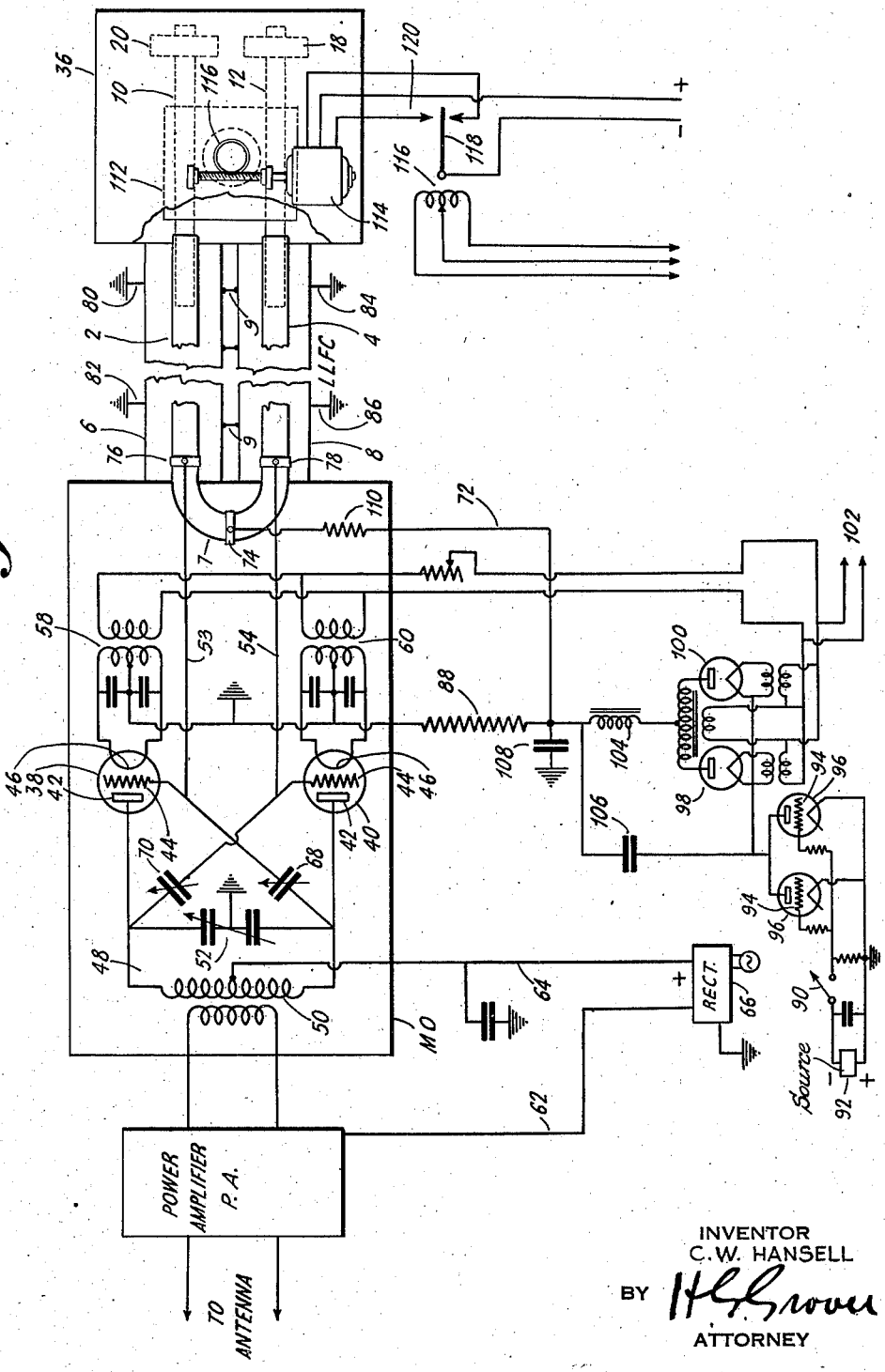
Figure 2 is an expanded variation of Figures 1a and 1b giving in greater detail the electrical circuits therefor as well as indicating the manner in which automatic frequency comparison and control with a standard source may be obtained.

As already indicated, the electrical circuits for the system shown in Figures 1a and 1b is given in greater detail in Figure 2 which also illustrates within the insulating box or housing 36 a means for automatically controlling the frequency of the long line controlled transmitter so as to follow or correspond with a controlling frequency.

Turning in greater detail to Figure 2, the master oscillator comprises a pair of electron discharge devices 38, 40 preferably of the water cooled variety, each having a plate or anode 42, a grid or control electrode 44, and a cathode or filament 46. Across the anodes of the vacuum tubes 38, 40, there is connected a parallel tunable circuit 48 consisting of an inductance coil 50 and a variable condenser 52. The circuit 48 acts as a rough frequency controlling circuit for controlling the frequency of oscillation of the pushpull connected electron discharge devices 38, 40. The line (which may be long) for frequency control is connected through conductors 53, 54 directly and conductively to the grids 44, and acts to accurately maintain the frequency of oscillation and hence the output of the master oscillator MO at a desired constant operating frequency. The action of the long line LLFC for frequency control and several alternative detail arrangements are explained more fully in my United States Patent No. 1,945,546, supra. Briefly, the action of the resonant line for frequency control may be explained by considering the line to be an exceedingly sharp resonant circuit which causes the oscillator to oscillate very constantly at its sharply resonant frequency. In another light it may be said that waves traveling down the line are reflected back so that standing waves on the line pull or lock the oscillations generated into step with the standing waves, and since the standing waves depend primarily upon the length of the line for their frequency it will at once be seen that the length of the line is the prime determining factor for frequency control. From still another angle it can be said that the standing waves on the line consist of an ingoing wave and a reflected wave, and the line tends to act so as to maintain substantially zero difference between the ingoing and reflected wave, and since any shift in frequency away from the frequency for which the line is a correct number of quarter wavelengths long will not give the zero phase difference, the line tends to react upon the system so as to establish the zero phase difference.

The filaments are supplied with heating potential from a source 102 supplying filament transformers 58, 60. In some cases I prefer to supply the two filament transformers 58, 60 from different phases of a two phase power supply in order to balance out much of the disturbing effects of alternating heating current. High voltage plate supply is obtained from leads 62, 64, connected to a rectifier 66.

The neutralizing condensers 68, 70 cross-connecting the anodes and control electrodes of tubes 38, 40, are adjusted so as to cause sufficient feedback for oscillation generation. Another feature of my present invention resides in the adjustment of these condensers so that the phase of the voltage on the grids is in advance, or in other words, so that the grid voltage leads the plate voltage. This adjustment is obtained by making the capacity of the neutralizing condensers somewhat larger than that required to cause perfect neutralization. By virtue of this adjustment appreciably better power efficiency than when using lagging phase is obtained as, for example, by setting the neutralizing condensers below the neutralizing point. By the use of over neutralization, I have found that there is an improvement in efficiency and this may be explained by considering that the time of travel of electrons in the tubes tends to make the plate current and the voltage lag behind the grid voltage. By making the phase of the grid voltage lead, the effect of time of electron travel is counterbalanced as a consequence of which more nearly optimum adjustments are obtained. This shift in phase due to time of electron travel is a minor factor in neutralized amplifiers because of the fact that the relative phase of the grid and anode voltage is not important. However, I have found that it becomes quite an appreciable factor in oscillation generators particularly of the water cooled type and particularly when used at the shorter wavelengths.

It should also be noted that, in the line controlled oscillator, the losses in the line constitute the greater part of the total load. If the oscillator were adjusted for oscillation by virtue of under neutralization the effective resistance in the grid circuit would give the grid voltage a phase shift in a lagging direction and this added to the phase shift due to time of electron travel might come to a considerable total. On the other hand, if oscillation is obtained by over neutralization, the line losses cause a shift in grid voltage phase in a leading direction so that the final resultant phase shift is the difference between that due to line losses plus time of electron travel. In cases where the plate circuit losses are predominant, as may be the case where the oscillator feeds energy directly to an antenna, it may be preferable in some cases to obtain oscillation by under neutralization in order to obtain optimum phase relations between anode and grid radio frequency voltages. In any case I choose between over and under neutralization to obtain optimum efficiency and the choice is principally governed by the distribution of loading in the circuits.

Grid bias and modulating potentials may be supplied through conductor 72 connected to a metallic slip ring 74 at the electrical center of the long line 2, 7, 4 which usually will be found at the midpoint of the C-shaped portion 7 of the line 2, 7, 4. The grids may be connected to similar adjustable slip rings 76, 78 and all three rings 74, 76, 78 may be provided with set screws which may, if desired, be soldered or brazed into fixed position after final adjustments have been made. The point 76, 78 should be chosen a sufficient distance away from the electrical center 74 upon the long line tube system so as to provide the proper control voltages for the grids 44 of the tubes 38, 40, when the line has the desired amount of circulating radio frequency energy.

Preferably I make the long line system including the inner hollow piping 2, 7, 4 and the outer hollow pipes or cylinders 6, 8 of solid copper. If desired, of course, the inner pipe may be made of other materials with a copper tubing or a sufficiently heavy copper plating at the surface thereof since at the high frequencies involved most of the current will tend to flow in the outermost surface of the tubing. To further reduce losses the inner pipe or line 2, 7, 4 may be made of copper and plated with a material of lesser resistivity such as silver. In cases where constancy of effective resistance is important a thin layer of gold on the surface is desirable. Gold has somewhat higher resistivity than silver or copper but is more free from tarnishing and therefore more constant. Also untarnished gold surfaces may very well have less energy losses than tarnished silver or copper surfaces. The cost of gold plating is not prohibitive at extremely high frequencies where the length of line is small.

As illustrated, the legs of the frequency controlling line are transversely spaced and arranged parallel to each other. The outer pipes 6, 8 prevent undesired radiation from the frequency controlling lines and protect it from disturbance due to other nearby equipment.

The minimum length of line which it is preferred to use as a stabilizing resonant circuit is substantially one-quarter wavelength, but, for pushpull use as illustrated in Figures 1 and 2, it is desirable and convenient to use a line whose total length is one-half of the wavelength of the desired operating frequency. The half wavelength is folded up upon itself as illustraed to form a U, which from one extreme end to the other is approximately one-quarter wavelength of the operating frequency. By making the line longer and in this particular case any number of half wavelengths long, its energy storage capacity is increased giving rise to increased stability as well as reducing temperature rise due to its own losses. The amount of energy which may be stored in a line is roughly proportional to its length, and the temperature increase for a given storage of energy is roughly inversely proportional to its length. For most practical purposes I prefer to make the long line system one-half wavelength in length.

A further feature of my present invention resides in the dimensioning of the inner and outer conductors of the long line system. I prefer to make the ratio of the inside diameter of the outer tubing to the outside diameter of the inner tubing between 2.5 and 5 and preferably of a value approximately 3.6. By making the ratio 3.6, I have found that standard sized pipes may be used with the accompanying advantage of having a minimum power factor. This, of course, is advantageous inasmuch as the smaller the power factor the less will be the losses in the line. I have found the characteristic impedance of a line having this ratio of diameters is 78 ohms regardless of the absolute value of the diameters.

For a minimum voltage gradient, assuming a given total voltage between the inner tubing 2, 7, 4 and the outer piping 6, 8, I have found that the ratio of an inside diameter of outer piping and the outside diameter of the inner piping should be 2.72.

In order to obtain a minimum voltage gradient for a given total stored or circulating energy between the outside surface of the inner tube or transmission line 2, 7, 4, and the inner surface of the outer tubing or shielding 6, 8, I have found that the ratio of inside diameter of outer piping to outside diameter of inner tubing should be 1.65.

For a maximum economy in the use of material the ratio of inside diameter of outer piping to outside diameter of inner piping, should be 4.68.

There are some general rules or laws applying to concentric conductor transmission lines which are of value to those interested in this application to design problems. Some of these laws are—1. The power factor of a line is proportional to the square root of the resistivity of the material used in it. 2. The power factor of a line is inversely proportional to the square root of the frequency. 3. The power factor is inversely proportional to the diameters of the conductors so long as the ratio of diameters is constant. 4. The maximum allowable energy storage capacity of a concentric conductor line is proportional to the square of the diameters of the conductors so long as the ratio of diameters is constant.

For a system operating at a wavelength of 10 meters and using solid copper inner and outer tubes for the long line frequency control system, the overall length of the inner conductor should be very close to 5 meters or 16.4 feet. Actually its length should be somewhat less than this because end effect and other factors always tend to give the line an effective length somewhat greater than this. Also, when using condenser plates such as 20, 18 to compensate for changes in tuning due to temperature rise of the inside pipe, these compensating plates are electrically equivalent to a small section of piping or tubing. These plates, therefore, should be taken into consideration when making up the U-shaped pipe for long line control.

For a system operating at 13,420 kilocycles or 22.35 meters it will be found satisfactory to utilize an outside pipe having an inside diameter of 20 inches and an inside pipe having an outside diameter of 5.56 inches. The total equivalent length of the whole U should be very nearly a half wavelength. At the wavelength taken, namely, 22.35 meters, the length of the U should be very nearly 11.175 meters or approximately 36.6 feet. It will be found that the power factor of such a system will be approximately 0.012 percent.

With respect to the outer tubes or conductors 6, 8 they are preferably cross-connected by connectors 9 and grounded along their length by grounding connections 80, 82, 84, 86. If desired the pedestals 26, 28 may be made of metal to further assist in maintaining the outer concentric conductors at ground radio frequency potential. The outer conductors, furthermore, may be made of a single piece like the inner conductor or transmission line and U-shaped, suitable openings being provided so as to enable connections such as 53, 54 to be made with the inner conductors and to the grids 44 of tubes 38, 40. It is preferred, however, to use two lengths of tubing for the outer tubes 6, 8 each length of which as shown is transversely spaced relative to their length dimensions and mounted concentrically about the legs of the inner frequency controlling transmission line.

The transmission line structure including the inner and outer conductors may be placed within a temperature controlled room or box (not shown) in which the temperature may be maintained constant. Or, the transmission line for frequency control may be placed within a container and kept at a very low temperature by the use of various refrigerating methods, care being taken to properly insulate the entire structure with heat insulating material such as asbestos, felt or wool, and further care being taken to prevent condensation of moisture upon the line. The latter may be effected by placing within the temperature controlling structure some hydroscopic material such as calcium chloride.

If desired I may also arrange to circulate cooling water through the inner line or a portion of it. In other cases I may bury the line in the ground in a vertical or horizontal position and depend upon the relatively constant ground temperature to assist in preventing frequency drift due to change in ambient temperature. In some cases I may also circulate air through the pipes by means of a blower or fan. In other cases I may make the outer pipes and end boxes air tight to keep out dust and moisture or I may use compressed air between the pipes to increase the flash over voltage limit.

For modulating the system shown in Figure 2, the plate voltage may be varied by introducing modulating potentials into the plate voltage lead 64 by means of a transformer or the grid voltage may be modulated by similarly introducing modulating voltages in the grid biasing lead 72. A convenient scheme for modulating the apparatus for code signalling is illustrated and is described more fully in my copending application Serial Number 672,529, filed May 24, 1933, Patent No. 2,060,988, November 17, 1936. As illustrated in Figure 2 the oscillator grid negative bias potential is obtained by passing the rectified grid current of the tubes through the common grid resistor 88. The transmitter is keyed by imposing a higher negative potential on the oscillator grids from the keying circuit which consists of a key or relay 90 applying and removing negative potential from source 92 to the grids 94 of the parallel connected keying tubes 96. The two rectifier tubes 98, 100 by rectification action rectify voltages from source 102 for use as negative cut-off bias for the two oscillator tubes 40, 38. Reactor 104 and condenser 106 act to smooth the rectified keying voltages.

When key 90 is down and applies negative potential to the grids 94 of the keying tubes 96, tubes 96 are biased to cut-off. Consequently, the bias rectifier 98, 100 is rendered inoperative so that no negative potential is applied to the grids 44 of the radio frequency oscillator tubes 38, 40. When the key 90 is up the grids 94 of tubes 96 assume filament potential as a consequence of which the tubes 96 become conductive allowing current flow from rectifiers 98, 100 to flow through resistor 88 as a result of which conductor 72 impresses a high negative bias upon the grids 44 of the radio frequency oscillation generator such that oscillation ceases. In passing it may be noted that the resistance 88 is common to both the oscillator and the keying circuit. Condenser 108 is the radio frequency by-passing condenser and the resistor 110 is provided to assist resistor 88 in establishing a grid bias for the grids 44 under oscillating conditions in tubes 38, 40. The resistor 110 is not essential to the operation of the system but is preferred, in some cases, since it assists in preventing spurious oscillations.

As the long line frequency controlled oscillators such as shown in Figure 2 are often placed out in the field with inexperienced help or placed in inaccessible places, and since for some reason or another there may be a slight drift in frequency, I have provided means as shown in Figure 2 for automatically correcting the frequency of the transmitter system so as to correspond with and closely follow some master controlling frequency such as may be generated by a carefully controlled piezo-electric crystal controlled oscillator. As shown in Figure 2, the frequency controlling means for the long line system consists of a rectangular metallic plate 112 raised or lowered by reversible electric motor 114 through the medium of worm gear and screw mechanism 116. The metallic plate 112 is grounded and by moving it further away from or nearer to the long line extension tubes 10, 12, the capacity between the ends of line or between each end and ground is increased or decreased thereby decreasing or increasing the frequency of operation. The motor 114 is operated by means of an electromechanical relay system 116 operating a switch 118 applying reversing potentials through leads 120 to the motor 114.

For operating a reversing switch such as 118 to vary some controlling means so that a locally generated frequency may correspond with some controlling frequency, methods have previously been devised for detecting relative variations in frequency which have included the use of beats between the two frequencies, which beats vary as the relative frequencies vary. As the beat system depends upon using the difference frequency between the controlling waves and the waves to be controlled, any shift in the frequency of the beat energy, which is passed through filters in such a way that change in frequency causes energy to pass through one filter or another depending upon the direction in which the frequency is changed, will give a resultant current across both filters which may be used for frequency correction purposes. When operating such that the correct beat frequencies are obtained the output of both filters are identical and hence there is no frequency correcting current.

However, the beat system has two operating points since the correct operating beat may be obtained when the frequency of the locally generated wave corresponds with the correct beat frequency above or below the controlling frequency. In other words, the beat system has two operating points, one of which will give a false indication, as a result of which it has been found that confusion is likely to ensue.

Figure 3:
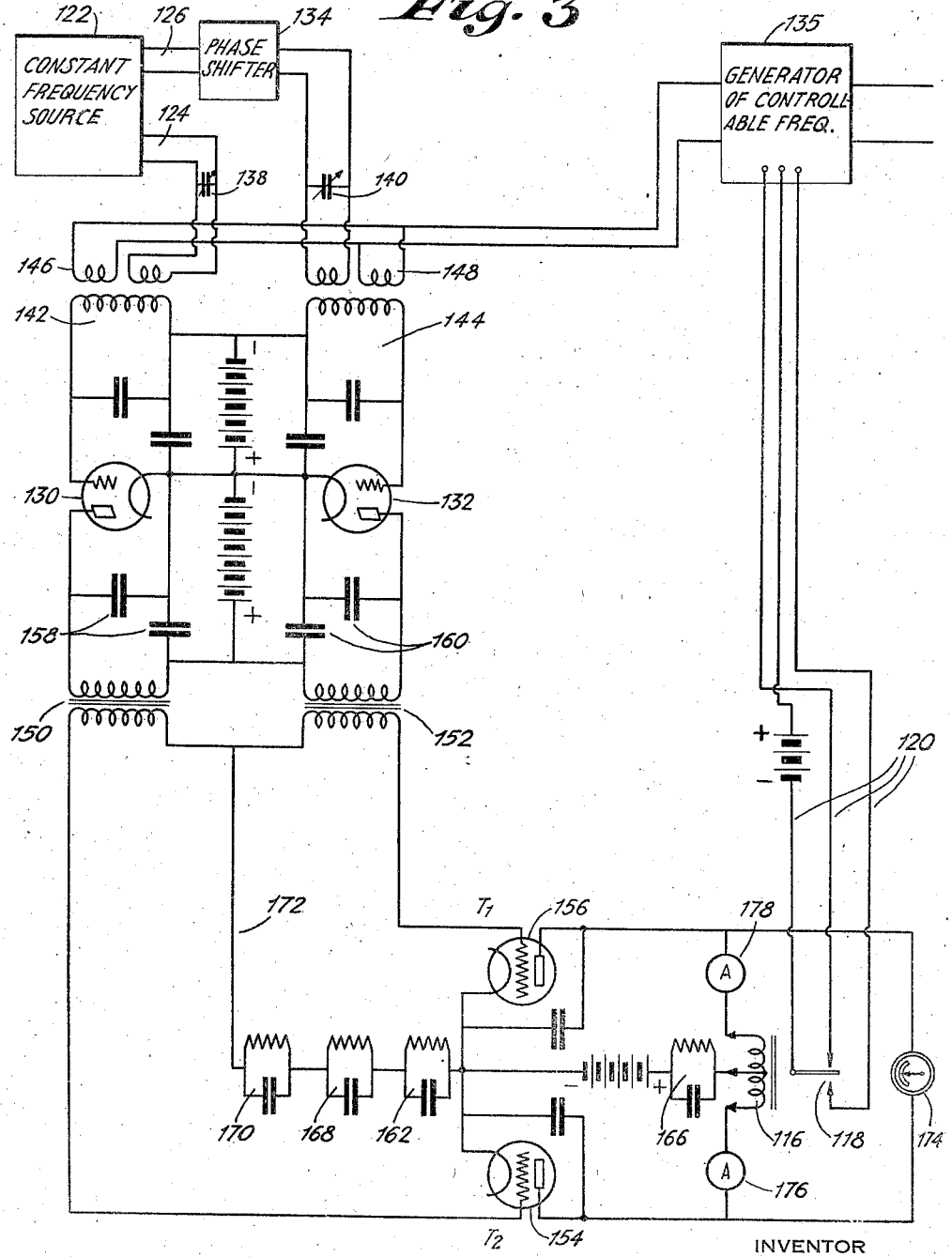
Figure 3 is a schematic circuit diagram of a circuit for frequency control which for its operation depends upon my novel teaching to the effect that as two oscillators are passed through zero beat, there is a reversal in phase of the resulting beat.

In the frequency controlling system which I have illustrated in Figure 3 and which may be used to operate the relay switch and motor mechanism 116, 118, 120, 114 of Figure 2, I have provided an arrangement which has only a single operating point and which will be incapable of giving false indications incidental to the use of the heretofore known beat system. Moreover, the arrangement shown in Figure 3 has the added advantage that it will be less subject to difficulties from audio harmonics which also tend to influence the operation of the beat system known to the prior art. And in addition the circuit arrangements described in Figure 3 have the added advantage of being simpler and consequently less expensive due mainly to the elimination of the heretofore required audio frequency filters.

Turning in greater detail to Figure 3, which by the way is not limited in its application to an arrangement such as described in Figure 2, but may be used for example to maintain constant the heterodyne oscillator of a receiver or in general make any local source correspond to some frequency controlling source, I have provided a constant frequency source 122 which may be a piezo-electric crystal controlled, and incidentally, temperature controlled oscillation generator so designed as to be substantially constant in frequency. Since large power output is not essential the oscillator 122 may be relatively small and consequently inexpensive. The output from the crystal controlled source 122 is fed through two separate circuits 124, 126, to the input electrodes of two vacuum tube power detectors or rectifiers 130, 132. In one of the circuits 124, 126, and as illustrated, in circuit 126, there is provided a phase shifter 134 which may be a tuned circuit, a radio goniometer or an artificial transmission line. Obviously the constant frequency source 122 may include frequency multipliers so that the output frequency corresponds in frequency to the frequency at which it is desired that the generator 135 of controllable frequency be operated.

Rather than use a phase shifter the two circuits 124, 126 may be tuned by condensers 138, 140 in which case the phase shift may be obtained by simply adjusting one circuit above and the other below the output frequency so that one carries the current of leading phase and the other carries lagging current with respect to the output voltage of the source 122. The phase shift should preferably be made such that the currents fed from circuits 124, 126 into the input circuits 142, 144 of the detectors differ by from 30 to 90 degrees. I may also shift the phases by means of reactance and resistance circuits.

The detectors 130, 132, while shown to be of the three electrode type may be of the diode or four or five electrode types and, in fact, may be replaced by other forms of detector such as the copper oxide type.

To the detector input circuits 142, 144, there is also supplied from coils 146, 148 connected to the controllable source 135 energy from the controllable generator. The detectors 130, 132, therefore, produce in the low frequency transformers 150, 152, beats between energy from the constant frequency source 122 and the source 135 to be controlled. It is to be noted that source 135 is to be operated at substantially the same frequency as that of the output of the constant frequency controlling source 122.

The beat frequency output of the two detectors 130, 132, will have a phase relation corresponding to the difference in phase between the currents in the two radio frequency circuits which couple source 122 with the inputs to the two detectors 130, 132. If, for example, condensers 138, 140 are set to give a phase difference of 60 degrees between inputs from source 122 to the two detectors then, in the outputs of the two detectors will appear beat frequency energy with a frequency equal to the difference between the frequencies of sources 122 and 135 and having a phase difference of 60 degrees.

The detectors, while shown of the bias type, are preferably in practice made to have grid leak resistors and condensers so as to eliminate the necessity of the grid biasing source. The outputs of the detectors, namely, the energies appearing in the secondaries of transformers 150, 152, are applied to the input or grid filament circuits of two vacuum tubes 154, 156 having a common output circuit including the electromagnetically operated relay system 116, 118.

When the generator 135 of controllable frequency is operating at exactly the output frequency of source 122, the beats appearing in transformers 150, 152 will be of zero frequency and double the frequency of either of the sources 122, 135. The double frequency, however, will be shunted around the transformers 150, 152 by the action of by-passing condensers 158, 160 and the switch member 118 will not be moved in either direction. However, with a shift in frequency of 135 away from the output frequency of controlling source 122 the direct plate currents of the two vacuum tubes 156, 154 will be unequal due to the phase relations existing between their grid voltages and thus any inequality in the plate currents is utilized to operate the relay system 116, 118 which in turn may operate an alarm, or (as shown in Figure 2), operate a reversible motor for automatically correcting the frequency of the controllable source. The principle upon which the system of Figure 3 operates may briefly be summarized by stating that as the generator 135 passes through zero beat, the phase relationship of the resultant beat frequency energies appearing in transformers 152, 150, reverses or shifts from one polarity to another. This phenomenon, namely reversal in phase of the beat as the combined frequencies pass through zero beat, is utilized to cause the system to return to zero beat condition and hence substantially identical frequency of operation of the controllable source with the controlling constant frequency source.

To understand the operation of the device shown in the figure, it should again be noted that the polarity of the beat frequency outputs from the two detectors is reversed as the transmitter frequency 135 is varied through zero beat with respect to the output of the crystal unit. Consequently, if the transmitter frequency is above the crystal frequency, one of the vacuum tubes, say 156 will have its grid swung positive in advance of tube 154 by an amount of time corresponding to the beat frequency and the phase relation between the two grid voltages. If the transmitter frequency is below the crystal frequency by a like amount, the polarities are reversed and, consequently, the grid of 154 is the first to swing positive instead of the grid of vacuum tube 156.

Under these conditions it is only necessary to provide some method for making the direct plate current of one vacuum tube greater than that of the other in accordance with the phase relations between their grid voltages. One method of doing this involves the use of a condenser and resistance such as are shown at 162. Assume that the time constant of condenser and resistance 162 is such that beginning at, say 100 cycles, the condenser begins to cause an appreciable smoothing out of the voltage variations across the resistance. Then the vacuum tube whose grid first swings positive will have grid rectification which will charge up the condenser and cause a negative potential to exist on the other tube at the time when it swings most positive. Assume, for example, that the phase relations between the two tubes is 60 degrees. Then if the excitation to 156 is leading in phase, 156 will have its grid potential positive once each cycle and 154 will follow at 60 degrees or one-sixth of a cycle later. It will then be five-sixths of a cycle before 156 again swings positive. Consequently, the time for the condenser to lose its charge after 156 swings positive, is only one-fifth as great as the time allowed for the charge to leak off in the time which elapses between 154 and 156 swinging positive. Consequently, tube 156 with its leading phase, will have an effective bias potential less than 154 and its plate current will consequently be greater than 154. If the polarities are reversed, 154 will be closely followed by 156 and there will be a relatively long time interval between positive peaks on 156 and 154 and, consequently, 154 will have a lower average bias potential and its plate current will predominate.

Thus it may be seen that the time discharge rate of condenser and resistance 162 in combination with the phase relations in the excitation between the two vacuum tubes, will give a differential plate current variation as the transmitter frequency is varied through zero beat with respect to the output of the crystal oscillator. If the beat frequency increases, the variations in potential across circuit 162 will tend to be smoothed out and reduced to smaller and smaller values. This would result in the differential variation decreasing at relatively high audio frequencies and would limit the maximum operating band in which the tube currents could be used to indicate in which direction the transmitter had varied. The frequency band may be increased by using a second resistance condenser circuit 166, connected in the plate circuit of the tubes. This circuit may be adjusted to have a different time constant than that of circuit 162. In this case it may be assumed that the condenser of circuit 166 begins to cause a lag in the potential across the resistance at a point where the audio frequency is so high that circuit 162 is beginning to lose its effect. In other words, the operating ranges of circuits 162 and 166 are made to overlap in such a way as to obtain almost twice as large an operating band as could be obtained with one circuit.

To still further widen the operating band, additional circuits of still different time constants such as 168, 170, may be serially connected in the common grid lead 172 and also in the plate circuit, in series with 166, if desired. In addition to the time constant circuits 162, 166 etc., the relay coil 116 may have considerable inductance and operate as an audio frequency auto transformer or, if expedient, two windings of a transformer may be connected in series with the two sides of the relay in such a way that their magnetic fields are adding in a common core. This transformer action may be utilized to extend the differential action of the two tubes still further. For example, assume that the excitation to tube 156 leads 154 by 60 degrees. Then when tube 156 has its current increasing it will make the plate of 154 more positive but this will not cause a current to flow in 154 because at this time its grid potential is still negative. However, at the time when the current in 156 is decreasing this will make the plate potential of tube 154 lower at a time when its grid is positive and the plate current will consequently be less in 154 than it otherwise would have been. Thus, the action of the time constant circuits and the transformer action of the relay all tend to cause the tube with the leading phase to have a higher plate current than the other tube. If the transmitter frequency moves through zero beat in such a way as to make the excitation to 154 lead that of 156, then 154 will have a predominating plate current and the relay will be reversed.

In order that the operator may have an indicator to show which way the frequency is varying before the relay has operated, a double range d—c voltmeter 174 may be connected across the relay coil. The direction of reading in this meter will then show whether the transmitter frequency is above or below the correct value. If preferred, two separate d—c meters 176, 178 may be used in series with the plate circuits of the two vacuum tubes, and further a bias source may be connected in series with lead 172 to make the tubes initially, cut off. Deflection of either meter 176, 178 will indicate leading phase applied to its corresponding vacuum tube.

The motion of the relay 118 under the control of tubes 154 and 156 will serve to close one contact or another, to operate an alarm system or to run a small motor, (as motor 114 of Figure 2), in one direction or another to correct the transmitter frequency.

To summarize the operation of the frequency controlling arrangement illustrated in Figure 3 it is to be remembered that source 135 is to be controlled or operated within quite narrow limits, at the same frequency as the frequency of oscillation of source 122. When both sources, namely 122 and 135, are of the same frequency, there will be zero output from the detectors 130, 132 as a result of which there is either no current or uniform current flow through the tubes 156, 154 and the tongue 118 is not moved to either direction. Should generator 135 drift in frequency above that of source 122 the relative phases of the resultant beats from the two detectors will differ in one direction and should the generator 135 fall below in frequency with respect to the frequency of source 122, the phase of the resultant beats will differ in the opposite direction. That is, the polarity of the beat frequency output from the two detectors 130, 132 is reversed as the source 135 passes through zero beat with respect to the output of the crystal unit 122. Now, assuming that the beat in the secondary of transformer 152 leads in phase the beat in the secondary of transformer 150, tube 156 will be caused to draw more current first and incidentally impressing a negative voltage upon the condensers in the common grid circuit for both tubes 156, 154. A time later, when tube 154 is operated there will have been impressed from the previous operation of tube 156 a negative potential on the grid of tube 154 as a result of which with a continuation of the condition just assumed, the mean current flow through tube 156 will be greater than that through tube 154. In other words, that tube of the two tubes 156, 154 which has the beat applied in leading phase, tends to rob the other tube of current causing the tube experiencing the leading phase excitation to draw a greater average current than the other tube. As shown in Figure 3 the greater current is caused to operate a relay tongue in one direction or another in turn causing a reversible motor to turn in one way or another and preferably in such a way as to cause the generator of controllable frequency to be adjusted so as to return to a frequency corresponding exactly with the frequency of the constant frequency source 122 and so that there is substantially zero beat between the controllable source 135 and the controlling source 122 again.

It will, of course, be possible to make many modifications in the detail arrangements of Figure 3 for carrying out this important aspect of my present invention. For example, the detector tubes may be of the grid leak type instead of the power type as shown. The output transformer for the detectors may be made of relatively low exciting reactance, if desired, so that the audio frequency outputs to the first detector tubes are kept small until the transmitter frequency has varied more than a predetermined amount. For example, it may be desirable not to make any correction of the transmitter frequency unless it varies more than 250 cycles from the correct value because this degree of control may be sufficient for communication purposes and to attempt to hold the transmitter any closer would result in unnecessary wear on the frequency correcting mechanism.

Also, in the diagram I have shown batteries for supplying anode and grid potentials whereas in actual practice, rectifiers or motor generators would commonly be used. It will also be apparent that for the sake of simplicity I have omitted the circuits for supplying filament heating energy. In practice, the filament heating might be from either a d—c or a—c source and probably an a—c source would be used.

In practice I may combine the functions of tubes 154, 156 with those of 130, 132 by applying the condenser-resistance circuits 170, 168, 162, 166 and the relay coil 116 to the grid bias and anode supply circuits of the detector tubes 130, 132. I have shown two separate pairs of tubes in Figure 3, for carrying out the functions of radio frequency detection and audio phase detection, in order to make the scheme easier to comprehend.

Obviously combining both functions in one pair of tubes will result in economy in equipment.

Figure 3A:
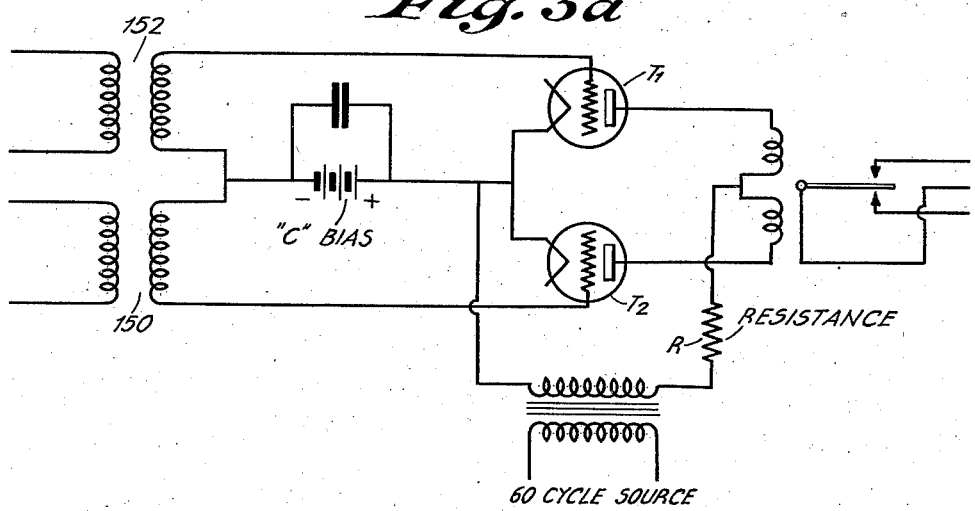
Figures 3a and 3b are alternative circuits which may be used in the system of Figure 3.

In place of two ordinary vacuum tubes such as 154 and 156, we might use vapor electric devices sold under the name of "Thyratrons" or "Grid Glow Tubes." These devices, which are struck into action by grid excitation, but are extinguished only by reduction in plate voltage, are supplied with anode energy from a 60 cycle source with circuits such that the first tube to have its grid swung positive would become a short circuit for a half cycle of the 60 cycle energy and would short circuit the anode supply of the lagging tube to prevent it breaking down at all. In this case, the leading tube would carry rectified current and the lagging tube would remain an open circuit. Such a circuit has been illustrated in Figure 3a which shows "Thyratron" or grid glow tube circuits suitable for carrying out the same functions as tubes 154, 156 and their associated circuits in Figure 3. It should be noted that the circuits of Figure 3a are not limited in application to radio equipment but may also be used in audio or power equipment to indicate phase relations. For example, in power generating stations the tube circuits may be utilized in performing most of the functions ordinarily performed by synchroscopes, even including the closing of circuit breakers to connect generators to the power system at the instant the generators have the same phase as the power system. A disadvantage, though not a very important one, of using vapor devices is that it would not be convenient to provide a voltmeter or other instruments to indicate to an operator the drift in frequency before the relay operated so that he might quickly make manual adjustments to prevent operation of the alarm or automatic correcting device.

In greater detail concerning Figure 3A, the beats to be compared are fed as before to the grids of vapor electric devices $T_1$, $T_1$. The tubes $T_1$, $T_2$ are biased by the "C" battery arrangement shown which may be replaced by a source of rectified $a-c$, such as a potentiometer resistance across a copper oxide rectifier. Whichever tube is struck by leading phase grid potentials will cause an arc or glow discharge through either tube $T_1$ or $T_2$ and the voltage drop produced in the common plate resistance R will prevent current flow through the other tube as its grid swings positive a short time later. It is to be noted that in the system of Figure 3A, $a-c$ potentials are used for energizing the plate electrodes. This is done in order to periodically break the plate current through the tubes, otherwise, with $d-c$ on the plates, and with one tube drawing current, that tube would no longer allow of desired operation as it would continue to keep the other tube extinguished even though, later on, leading voltages were applied to the other tube.

Figure 3B:
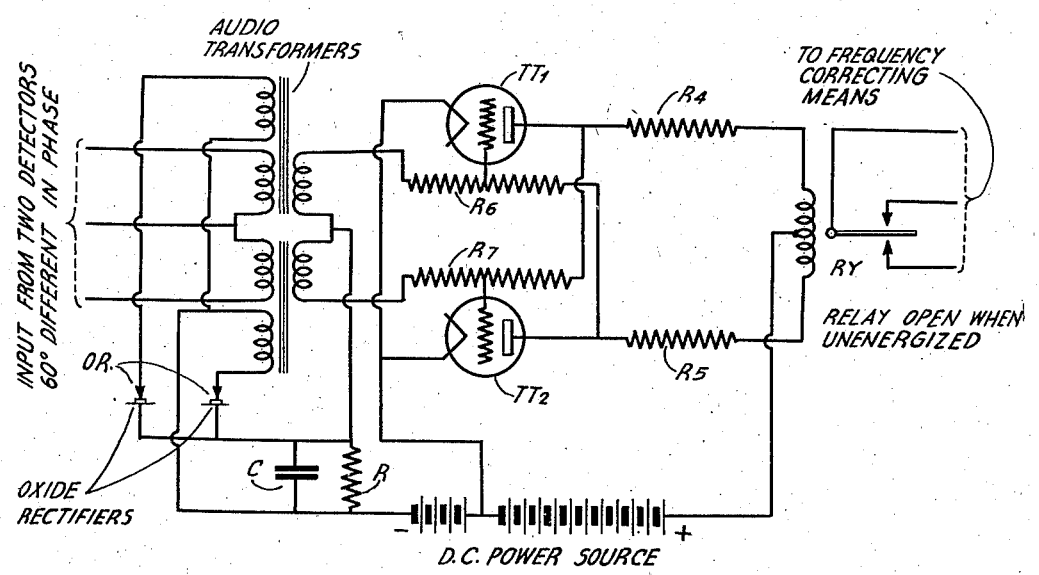

Still another very useful and practical circuit to detect phase changes is illustrated in Figure 3b. In Figure 3b, I have shown a tripping circuit, described by James L. Finch in his U. S. Patent 1,844,950 which consists of a pair of multi-electrode vacuum tubes $TT_1$, $TT_2$, inter-linked by means of resistance coupling circuits R4, R5, R6, R7, in such a way that if either tube predominates in carrying plate current it will cause the other tube to cut off and its own current to be a maximum. If this condition of current through a single tube is disturbed by momentarily forcing current to flow in the tube which had cut off and at the same time decreasing the flow of current in the tube which had been carrying current the unbalance is reversed, that is the action of the two tubes is somewhat analogous to a snap switch the contacts of which can have only two definite positions and which is so designed that any intermediate positions are unstable and cannot be held for any appreciable time. By applying the phase displaced detector outputs to the two tubes it is possible to cause these detector outputs to throw the unbalance of the tripping circuit back and forth. The output of one detector can be used to cause one tube to take all the current while the output of the second transformer can be used to cause the second tube to take all the plate current. The phase displaced output from the two detectors will cause first one tube and then the other to carry plate current but the interval during which one tube carries current will be much greater than the interval available to the other, depending upon whether or not the transmitter whose frequency is being monitored is above or below the frequency of the standard monitoring source. Due to the unbalance in time during which the tubes carry current there will be an unbalance in average $d-c$ current which can be utilized to operate the relay RY.

In practice it is very desirable that the tripping circuit be made inoperative unless there is an output from the two detectors and unless the frequency of this output is above a predetermined value. I obtain such an action by normally biasing the two tripping tubes so highly that no plate current can flow in either of them and then overcome this bias or a portion of it by means of another $d-c$ voltage obtained by rectification of a portion of the detector outputs. Thus, I have shown oxide rectifier OR in the sketch to obtain the bucking voltage for the bias source. Since the amplitude of the bucking voltage is proportional to the amplitude of the audio output from the detectors the whole system is relatively insensitive to variations in volume of detector output. This is a desirable feature for practical applications where constant volume would be somewhat difficult to obtain. In the arrangement which I have shown it is only necessary for the volume to be sufficiently high to cause the tripping circuit to function. If either the standard frequency source or the transmitter should fail the tripping tubes are immediately rendered inoperative and no further changes are made in the adjustment of the transmitter frequency control equipment. Consequently, as soon as the failure or interruption of energy is corrected, the transmitter frequency immediately comes again under the control of the correcting device and in no case has been run to the extreme range permitted by the frequency control. Also, if the device is used to monitor the output from a keyed transmitter its operation is not affected by the keying except, of course, that the relay may tend to make contact intermittently if the keying is quite slow.

If desired, the plate currents of the vacuum tubes or vapor devices may, of course, be used to directly operate an alarm device or to control the power supply to a motor without the intermediate control relay. For example, the plate currents of the two tubes may be passed through field coils of a small motor in directions to cause opposing fields and in this case the direct resultant field magnetization will depend upon the difference between the two tube anode currents.

Figure 4:
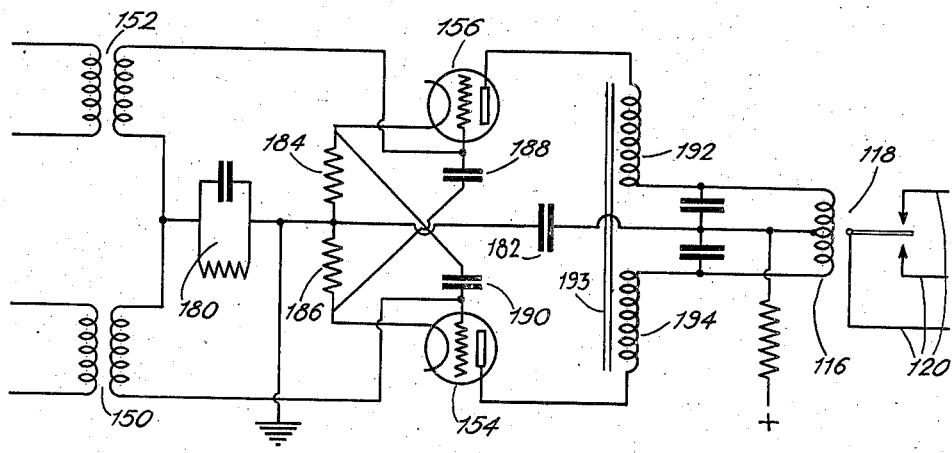
Figures 4 and 5 are alternative circuits which may be used in place of a portion of the circuit shown in Figure 3.
Figure 5:
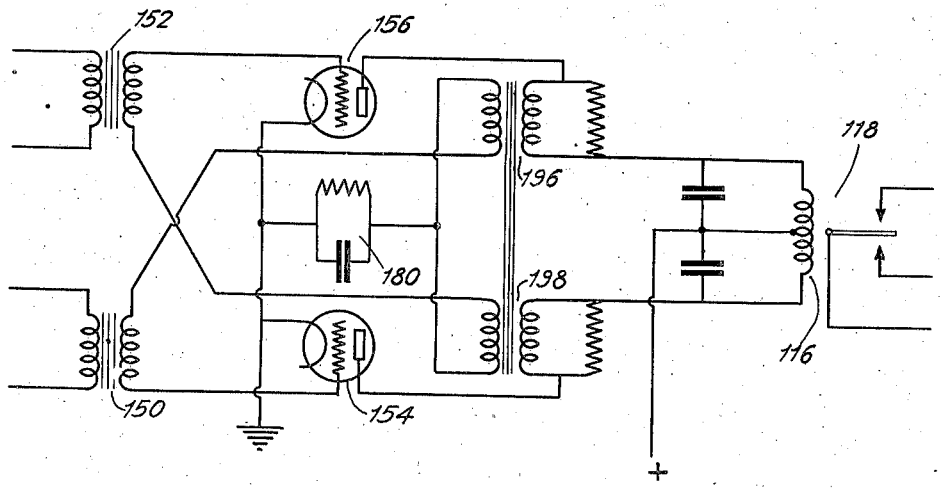

Further circuits for detecting the phase of the beat by comparing two like frequencies one of which tends to drift through zero beat, are illustrated in Figures 4 and 5. The circuits of Figures 4 and 5 illustrate means for increasing the speed of detection of the phase shift.

Turning to Figure 4 in greater detail, the input to the tubes 154, 156 corresponding to similarly labeled tubes in Figure 3, is derived from transformers 152, 150 in turn connected to detectors not shown corresponding to the detectors 130, 132 of Figure 3, one of the inputs in either transformer 152 or 150 is leading in phase depending upon whether the frequency to be monitored is above or below the standard frequency from the frequency controlling source. The condenser resistance circuit 180 and resistors 184, 186 and the feedback through condensers 188, 190 together with the action of transformers 192, 194 all tend to produce an unbalance in plate currents of the two vacuum tubes 154, 156. The current through one or the other tube predominates, of course, when the phase relations of the input from the detector output transformers 150, 152 reverses. The unequal plate currents then cause operation of the electromagnetic relay whose output leads 120 may be connected to any suitable alarm or frequency correcting device such as the frequency correcting motor 114 of Figure 2.

The transformers 192, 194 of Figure 4 are wound upon one core 193 and so arranged that when current through the tube subjected to leading voltages is decreasing, the decreasing current causes an induced E. M. F. in the other coil tending to reduce the plate voltage on the tube experiencing the lagging input voltage. This tends to further rob the lagging tube of current and accentuate the unbalance caused by the phase shift of the beat.

In the phase detector and indicating system of Figure 5 the inputs from two radio frequency detectors such as 130, 132 of Figure 3 are fed into the transformers 150, 152 of Figure 5. As before the condenser-resistance combination 180 is charged first by that tube to which the leading phase currents are applied. The retained charge upon the condenser-resistance combination 180 therefore tends to reduce the current flow through the tube to which the beat is relatively lagging in phase. The transformers 196, 198 are so arranged and connected that as the plate current through that tube to which the leading phase voltages are being applied decreases, the induced E. M. F. caused by the decrease in current is such as to reduce the voltage on the grid of the tube being subjected to the lagging beat. In this way the unbalance due to the leading beat is accentuated causing quicker and more positive operation of the alarm or frequency correcting device relay 116, 118. In the arrangement shown in Figure 5 the grid connections to the transformers 196, 198 may be reversed so that leading voltages applied to one tube in effect causes the other tube to draw current and hence operate the electromagnetic relay 116, 118.

In circuits similar to that shown in Figure 5 I may, of course, use transformer coils 196, 198 to feed back to the screen grid of a four electrode tube instead of to the control grids of three electrode tubes as shown. In fact I may employ tubes with any number of electrodes in any of the circuits of my invention. I may also use tubes with any type of cathode and, in practice, heater type cathodes, which permit the use of alternating heating current without disturbance in the system, are preferred.

The frequency controlling systems of Figures 3, 4 and 5 may vary a condenser or an inductor or a combination of both for controlling other forms of oscillation generators such as used, for example, in heterodyne receivers or elsewhere. Also, it is not necessary in connection with long line systems that a plate such as 112 of Figure 2 be moved vertically for, as shown in Figure 8 the leads 120 connected to a reversible motor 114 may supply currents which cause capacity elements 200 to move in opposite directions. The opposite movement is produced by virtue of the internally threaded screw 202 engaging the threaded male supports 204 for the cylindrical sectioned capacity elements 200. The opposite movement is caused by the motor 114 driving the screw 202 through the medium of a suitable screw and gear mechanism 206. Insulating guides 210 for the cylindrical capacity elements 200 may be provided if found desirable.

The capacity adjusting element described in greater detail in Figure 8 is illustrated only diagrammatically in Figure 6 which shows a long line frequency control system for very short waves, the leads 120 being the leads 120 of Figure 3 and the capacity elements 200 being the capacity elements 200 of Figure 8.

Going into greater detail concerning the construction of the long line very short wave system of Figure 6, the pushpull connected vacuum tubes 38, 40 are provided with fluid cooling or water cooling jackets 212, 214. The plate or anode circuit of the pushpull connected tubes 38, 40 includes the rectangular or circular flat capacity plates 216, 218 directly metallically connected to the water cooling jackets 212, 214. Rotation of knob 220 rotates the screw and gear mechanism 222 and hence the rotation of the internally threaded member 224 in turn causing the variable grounded plates 226 to approach or recede from the condenser plates 216, 218 simultaneously. As illustrated, condenser plates 226 may be grounded for purposes of symmetry through the gear mechanism and conductor 230. The inductance of the plate circuit is formed by bi-filarly wound metallic coils 232, 234 to the electrical center 236 of which, by means of inlet pipe 238 and outlet pipe 240, cooling fluid or water is introduced or removed from the anode jackets 214, 212. For very high frequencies the inductance of the plate circuit may be formed of straight pipes rather than coils. The water cooling system is described in greater detail in United States Patent No. 1,963,131, granted June 19, 1934, to H. E. Hallborg. Anode potential is applied through lead 242 connected to the inlet and outlet pipes 238, 240. If desired 240 may be made the inlet pipe and 238 the outlet pipe. Usually it is best to pass the cooling fluid through the jackets in an upward direction in order to assure that practically all air is forced out of the jacket leaving only the fluid in contact with the anode of the tube. The coils 234, 232 which act as the unitary structure for high frequency electrical currents but has a dual path for cooling fluid, are shown arranged so that their axes are parallel to the longitudinal cylindrical axes of the cooling jackets 214, 212. In practice I make the axes of the cooling jackets and of the straight or coiled plate circuit inductance vertical and so shaped that all the cooling fluid can drain out when the supply of fluid from a pump is interrupted. This prevents damage to the system from freezing of the fluid when water is used and facilitates the exchanging of tubes by prevention of spilling of the fluid when tubes are removed from the jackets. As an aid to prevention of freezing I may use various well known antifreezing mixtures for the cooling liquid.

For a change in frequency, there are provided the conductors 244, 246 which are variably tapped to the coils 234, 232, and by connecting the conductors 244, 246 together by means of a suitable switch 248 the effective inductance of the output circuits of the tubes may be varied and hence the frequency may be varied by a relatively large amount, connection of switch 248 to connectors 244, 246 acting to short circuit away a part of the inductance of the plate circuit of the pushpull oscillation generator. Tuning variation may also be accomplished by manipulation of knob 220 hence varying the plate tuning condenser 216, 226, 218. Output energy is taken by means of coils 250, 252 coupled respectively and inductively to the water cooled coils 234, 232. The coils 250, 252 may be connected together and to ground as at 254 and have their other ungrounded terminals connected through by-passing condensers 256 to a radiating antenna 258. The coils 250, 252 may be insulatingly supported within and coaxially with the water cooled coils 234, 232, or if desired may be wound about and insulatingly supported from the water cooled coils. If the inductance 232, 234 is formed of straight tubing, as would be the case at very high frequencies then the coupling 250, 252 may also be made of straight conductors placed parallel to and near the conductors 232, 234.

The grids 260, 262 of the tubes 38, 40 are variably connected through connectors 264, 266 to points 268, 270, on either side of the electrical center 272 of the long line LLFC for frequency control. Since the system of Figure 6 contemplates very short waves, the long line for frequency control is made in the form of a continuous flattened ellipse with two trough, bent, bottom or C portions 274, 276, the midpoints of each trough or elbow portion 274, 276 being at a voltage nodal point. Intermediate the troughs the portions 278, 280 are linear or straight and are arranged parallel to each other. For frequency adjustment it is preferred that the capacity elements 200 be arranged opposite the midpoint or at a current maximum point on the inner tubular conductor forming part of the long line frequency control system. About the straight portions 278, 280 of the inner tubular conductor of the long line system there are suitably mounted concentric linear tubes or pipes 282, 284 suitably cross-connected and grounded along their length so as to maintain them at zero radio frequency potential. If desired the outer conductors 282, 284 may be made continuous and completely concentric around the inner conductor 274, 276, 278, 280 but in that case openings for the various connections to the inner transmission line 274, 280, 276, 278 should be provided. The dimensioning of the long line system is preferably made in accordance with that specified for the long line system of Figures 1 and 2 and hence for the sake of brevity will not be repeated here. The overall length of the long line system shown in Figure 6, that is to say the mean length of the inner conductor 274, 278, 276, 280, should be a whole number of half wave lengths long at the desired operating frequency. For adjustment to different frequencies, it should be noted that the same line would be effective for approximately harmonically related frequencies. Hence, by suitably tapping conductors 244, 246 to the water cooled coils, quick change to a harmonically related frequency and stabilization on the same long line may be obtained by the connection of short circuiting strap 248 to the contacts 244, 246. Where operation is desired at frequencies which are not harmonically related I may also provide means for quickly changing the effective length of the line by means of switching in or out sections of line, shunt or series inductance, capacity, etc.

If desired, the long line system may be placed within a suitable container 290 of heat insulating material and the long line system temperature controlled. Moreover, a wall 292 may be placed across one end of the line and temperature controlling fluid fed on one side of the wall 292 through tube 294 and removed from the other side of the wall by tube 296, the circulation of fluid through the inner conductor being as indicated by the arrows. Suitable pumping mechanism 298 may be provided for causing a continuous circulation of the temperature controlling fluid in the long line which may be water or oil maintained at a suitable temperature or which may be air or any gas. In case the circulating fluid or gas is held at a temperature below that of the room or space around the line then some hydroscopic material should be placed within the heat insulating material 290 to prevent the formation of water drops upon the long line system. Such condensation, it should be noted, would tend to change the operating frequency due to the fact that it would change the velocity of the electrical waves along the line.

As a further aid to short wave operation the legs of the filaments of the tubes 38, 40 may be short circuited together for high frequency currents by means of by-passing condensers 300 so that the filament heating conductors 302, 304 act in parallel for high frequency as do also filament heating conductors 306, 308. At the electrical centers 310, 310, of the loops formed by the heating conductors 302, 304, 306, 308, another by-passing condenser 312 may be connected and filament heating energy applied adjacent thereto as for example by feeding low frequency heating currents thereto by means of a transformer 314. The conductors 302, 304, 306, 308 will then act, by judicious choice of their length, as a tuned filament circuit for the high frequency waves and their impedance should be so adjusted as to obtain optimum operating conditions, that is to say, so that the filaments fluctuate at the high frequency potential at a desired amount and with the desired phase relation.

For modulation any of the schemes described in connection with Figure 2 may be used, it being noted in addition that the source 92 of Figure 2 may be replaced by an amplified alternating current source such as a keyed tone source, or, by amplified voice currents. Also source 92 may consist of a rectifier supplied with amplified and keyed or modulated relatively low frequency current. For example, in one application of my invention, telegraph signals are sent, from an automatic sender in a central telegraph office, over a wire line, as one channel of a number of channels carried by the same line, to a radio transmitting station. At the radio station, filters separate the signals of the several channels by frequency discrimination. The energy of one or more channels is then amplified and rectified to supply the input to a transmitter at the point indicated as 92 in Figure 2. As the service requires, the automatic telegraph sender in the central office may be replaced by automatic printer mechanism or by a facsimile transmitter.

Another desirable scheme for modulating a line controlled system is illustrated in Figure 6. Grid bias is fed through conductor 320 to the electrical center 272 of the long line and thence through conductors 264, 266 to the grids 260, 262 of vacuum tubes 38, 40. Variation in the grid bias as impressed by conductor 320 will cause modulation of the output of the frequency controlled system. A pair of diode rectifiers 322, 324 are coupled by means of their plate coil 326 symmetrically to the plate circuit of the pushpull connected tubes 38, 40. By coupling the rectifier coil 326 sufficiently close to the plate circuit, enough of the radio frequency energy developed by the oscillator will be rectified and cause sufficient drop in the resistor R and across radio frequency by-pass condenser C so as to limit the oscillator output.

In addition to this rectifier system for obtaining grid bias there is serially connected a battery 328 which may be replaced by a potentiometer resistor supplied with voltage from a 60 cycle rectifier system. This second source of negative potential 328 serves to adjust the circuits for best operating characteristics.

In operation, the two sources of grid bias, namely, source 328 and the bias developed by rectifiers 322, 324 should be adjusted to limit the oscillations developed by the pushpull amplifiers 38, 40 to about half of maximum amplitude. In series with the bias sources there is connected the secondary of a low frequency transformer 330 supplied with amplified tone currents or voice currents from an amplifier 332. The fluctuations in grid bias due to the alternating voltages developed in the secondary of transformer 330 will then vary the output from the oscillator in accordance with modulation.

The advantage of this modulation system resides in the relatively small size of the modulation equipment and also in its relatively small cost.

The plate lead 242 is shown grounded for radio frequency currents by means of a by-passing condenser 334. It may be found desirable in suppressing spurious oscillations not to ground point 236 and in that event a high frequency choke should be inserted in series with the lead 242 and the end of the choke away from the point 236 should be connected to the by-passing condenser 334.

If desired I may modify the modulating system of Figure 6 by using triode tubes in place of the diodes shown at 322 and 324. The triodes will then be supplied with direct grid biasing potential either from a separate source or by means of parallel resistance and capacity connected between the cathodes and ground or source 328. The grid biasing potential to the trodes is then so adjusted that the drop across resistance R, or this drop plus the potential of source 328 when 328 is used, biases tubes 38, 40 to such an extent that appoximately half maximum output current to the antenna is obtained. The output of amplifier 332 is then applied to the grids of the triodes which replace diodes 322, 324. Under these conditions the oscillator output will be modulated in accordance with the output from amplifier 332.

Obviously, if desired, my oscillator systems may be left unmodulated and followed by amplifiers and/or frequency multipliers the outputs from which are modulated.

In the long line frequency controlled system of Figure 7, the reversible motor 114 drives a triangular grounded metallic plate 336 back and forth so that the capacity between this plate and the end plates 338, 340 connected to the free electrical ends 342, 344 of the inner transmission line 346, 348, 350 is varied. The outer tubes or pipes 352, 354 are connected together and grounded as indicated and are used to shield the inner legs 346, 350 of the U-shaped frequency controlling tubular metallic transmisison line. As before the grids of the tubes 38, 40 are connected by means of conductors 264, 266 on opposite sides of the electrical center 272 of the inner concentric conductor. In addition to the neutralizing or feedback control condensers 356, 358, there are provided feedback condensers consisting of inner and outer cylinders 360, 362 and 364 and 366, tube 360 being insulatingly supported from tube 362 and tube 364 being insulatingly supported from tube 366. By moving the tubes 360, 364 in and out of tubes or pipe sections 362, 366, an adjustment in addition to the feedback adjustment given by condenser 356, 358 may be had. The plate tuning condenser is diagrammatically shown at 368 connected between the water cooling jackets 212, 214 of vacuum tubes 40, 38. The plate inductance coil in this instance consists of a single doubly wound metallic tube 370 provided with inlet and outlet water cooling ducts 372. Obviously the plate inductance may be made of straight tubes for very high frequency operation. Output energy may be taken from blocking condensers 375 and fed directly into an antenna or to any subsequent amplifier as found desirable. Plate potential is fed from conductor 242 through two choke coils 374, 376 to points 378, 380 on opposite sides of the electrical center of the coil 370 which center is preferably made between the inlet and outlet pipes 372. By closing switch 382, a section of the water cooled inductor 370 may be short circuited out of circuit causing, if desired, operation at some harmonic frequency. This construction is often desirable where mechanical considerations restrict the location of tapping points 378, 380, for, by adjusting the size of coils 374, 376 and the inductance of connections through the switch 382, it is often possible to adjust the circuits to either of two desired operating frequencies much more readily than can be done by varying taps 378, 380 alone. The line for frequency control is well adapted as explained in my above mentioned United States Patent No. 1,945,546, for control at either the fundamental or any harmonic frequency. It should also be noted that, if desired, I may provide more than one frequency controlling line and connect them to the grids of the tubes alternately or in various combinations to obtain various frequencies and conditions of operation. The changing of connections may be done by manual changing of connections or by means of selective switches as desired. In some cases one operating handle or mechanism will simultaneously operate switch 382 and change frequency controlling lines.

For modulation purposes voice currents from an audio frequency amplifier 384 are impressed upon the transformer 330 corresponding to the transformer 330 of Figure 6. In place of the battery 328 of Figure 6, however, a rectifier 386 has been illustrated in Figure 7.

The dimensioning of the line system of Figure 7 should be in accordance with the statements expounded for Figures 1 and 2 and the long line system may be supported if desired as shown in Figures 1a and 1b or may be suspended from an overhead structure such as the ceiling supporting girders of a power house.

It has been stated that for substantially harmonically related frequencies the same long line can be used, it being necessary only to change the plate circuit which is a rough frequency controlling circuit, the line acting to accurately stabilize the oscillations at the harmonic frequencies. For switch-over from one frequency to another where the frequencies are not harmonically related, I prefer to have two complete long line controlled oscillation generator systems, and switch from one to the other. In addition it is preferred that the switching means allow of the use of the same rectifier and modulation supply and apparatus for both long line systems. In this case I may also provide for operating both oscillation systems simultaneously from the same power supply and modulation source. This is desirable at transition periods where one frequency is fading out and the other becoming effective, over a communication circuit, in order that continuous communication may be had while the traffic is being transferred from one high frequency channel to another.

For temperature compensation of the line system schemes other than the ones suggested may be used, for example, a section of metallic pipe may be run parallel to the line and this pipe may be filled with oil or some other liquid having a high temperature coefficient of expansion. At the end this parallelly run pipe there may be mounted a "sylphon" bellows, the end of which will move back and forth as the temperature of the oil varies. This movement of the bellows may be used to actuate condenser plates for changing the natural period of the line to compensate for changes in temperature, or, it may be used to vary the effective length of the line by moving the telescoped ends of the line. In connection with this system a crosswise section of piping may be connected to the lengthwise section of the pipe and this cross portion may be mounted within a container about a portion of the frequency controlling line. By varying the length or size of the cross pipe the relative exposure of the whole volume of oil may be controlled in order to obtain proper thermal coupling to room temperature and to the temperature of the inner pipe as a consequence of which the system will compensate for both room temperature variations and temperature rise due to the losses in the line itself.

It should be understood that the frequency control line of the invention comprises, in effect, a tuned circuit in the form of a resonant line wherein the inside surfaces of the outer conductors and end boxes form the complete return circuit for currents flowing on the outside surface of the inner conductor. Since the surfaces carrying the high frequency current are of relatively large cross section or circumference and made of relatively low resistance material such as copper, silver, or gold, there are very low radio frequency losses and as a result the line forms an extremely sharply tuned resonant circuit which can be used to maintain very constant oscillator frequencies.

Although the drawings show the outer conductor of the frequency control line and the end boxes connected to ground at several points, it is to be understood that such ground connections merely indicate points of zero radio frequency potential, and that it is not necessary to actually "ground" the line. As a matter of fact, high frequency circuits seldom, if ever, are designed for actual effective connection to earth. Since the outer surfaces of the whole enclosure for the resonant line, including the outer pipes, end boxes, power amplifier enclosure and supports, are at zero radio frequency potential, it is common careless practice to speak of them as being "grounded" or "at ground potential" whereas what is actually meant is that there are no differences in radio frequency potential between any points on their outer surfaces.

Having thus described my invention, what I claim is:

1. A constant frequency oscillation generator comprising a pair of multi-electrode devices each having anode, cathode and grid electrodes, a circuit having inductance and capacity and being approximately resonant to a desired operating frequency connected between said anode electrodes so that said anode electrodes fluctuate in phase opposition, a circuit connected between an intermediate point on said approximately resonant circuit and said cathodes, a U-shaped tube having substantially an electrical overall length of a multiple of one-half wavelength taken at the desired operating frequency, a connection from the trough of said U-shaped tube to said cathode electrodes, and connections from said grid electrodes to points on said U-shaped tube substantially symmetrically disposed with respect to said aforementioned trough cathode connection.

2. A constant frequency oscillation generator comprising a pair of multi-electrode devices each having anode, cathode and grid electrodes, a circuit having inductance and capacity and being approximately resonant to a desired operating frequency connected between said anode electrodes so that said anode electrodes fluctuate in phase opposition, a circuit connected between an intermediate point on said approximately resonant circuit and said cathodes, a U-shaped tube having substantially an electrical overall length of one-half wavelength taken at the desired operating frequency, a connection from the trough of said U-shaped tube to said cathode electrodes, connections from said grid electrodes to points on said U-shaped tube substantially symmetrically disposed with respect to said aforementioned trough-cathode connection, and a grounded metallic cylinder around each leg portion of said U-shaped tube, and insulated therefrom.

3. A constant frequency oscillation generator comprising a pair of multi-electrode devices each having anode, cathode and grid electrodes, a circuit having inductance and capacity and being approximately resonant to a desired operating frequency connected between said anode electrodes so that said anode electrodes fluctuate in phase opposition, a circuit connected between an intermediate point on said approximately resonant circuit and said cathodes, a U-shaped tube having substantially an overall length of a multiple of one-half wavelength taken at the desired operating frequency, a connection from the trough of said U-shaped tube to said cathode electrodes, connections from said grid electrodes to points on said U-shaped tube substantially symmetrically disposed with respect to said aforementioned trough cathode connection, a grounded metallic cylinder about and insulated from each leg portion of said U-shaped tube, and means for varying the effective overall electrical length of said U-shaped tube.

4. A constant frequency oscillation generator comprising a pair of multi-electrode devices each having anode, cathode and grid electrodes, a circuit having inductance and capacity and being approximately resonant to a desired operating frequency connected between said anode electrodes so that said anode electrodes fluctuate in phase opposition, a circuit connected between an intermediate point on said approximately resonant circuit and said cathodes, a U-shaped tube having substantially an overall length of one-half wavelength taken at the desired operating frequency, a connection from the trough of said U-shaped tube to said cathode electrodes, connections from said grid electrodes to points on said U-shaped tube substantially symmetrically disposed with respect to said aforementioned trough cathode connection, a grounded metallic cylinder about and insulated from each leg portion of said U-shaped tube, and means for varying the effective overall electrical length of said U-shaped tube, said means comprising lengths of tubing telescoped within the open ends of said U-shaped tube.

5. A constant frequency oscillation generator comprising a pair of multi-electrode devices each having anode, cathode and grid electrodes, a circuit having inductance and capacity and being approximately resonant to a desired operating frequency connected between said anode electrodes so that said anode electrodes fluctuate in phase opposition, a circuit connected between an intermediate point on said approximately resonant circuit and said cathodes, a U-shaped tube having substantially an overall length of one-half wavelength taken at the desired operating frequency, a connection from the trough of said U-shaped tube to said cathode electrodes, connections from said grid electrodes to points on said U-shaped tube substantially symmetrically disposed with respect to said aforementioned trough cathode connection, a grounded metallic cylinder about and insulated from each leg portion of said U-shaped tube, means for varying the effective overall electrical length of said U-shaped tube, and means for varying said last means automatically and in such a way as to cause said multi-electrode devices to generate oscillations of a frequency corresponding to the frequency of a controlling wave.

6. An oscillation generator comprising a multi-electrode device having anode, cathode and grid electrodes, a circuit having inductance and capacity roughly tuned to a desired frequency of operation coupled to said anode and cathode electrodes, and an accurate frequency controlling circuit coupled to said grid cathode electrodes, said accurate frequency controlling circuit comprising a pair of linear tubes one within another, each of said tubes being substantially some whole multiple of a quarter wave length long at a desired operating frequency, the ratio of the inside diameter of the outer tube to the outer diameter of the inner tube being not less than 2.5 nor more than 5.0.

7. An oscillation generator comprising a multi-electrode device having anode, cathode and grid electrodes, a circuit having inductance and capacity roughly tuned to a desired frequency of operation coupled to said anode and cathode electrodes, and an accurate frequency controlling circuit coupled to said grid and cathode electrodes, said accurate frequency controlling circuit comprising a pair of linear tubes one within another, the ratio of the inside diameter of the outer tube to the outer diameter of the inner tube being 3.6, said inner tube being substantially one-quarter wave length long at a desired operating frequency.

8. An oscillation generator of constant frequency comprising a pair of multi-electrode tubes each having anode, cathode and grid electrodes, a circuit roughly tuned to a desired operating frequency and having inductance and capacity connected between the anode electrodes of said devices so that at the operating frequency the anodes fluctuate out of phase, a circuit connected from an intermediate point on said roughly tuned circuit to the cathodes of said devices, a U-shaped tube having substantially parallel linear legs, each leg being substantially a quarter wave length long at a desired operating frequency, a connection from the trough portion of said tube to the cathode electrodes of said devices, connections from the grid electrodes of said devices to points on said U-shaped tube on opposite sides of said trough cathode connection, and a grounded metallic linear cylinder disposed about each of the linear legs of said U-shaped tube, the ratio of the inside diameter of each cylinder to the outside diameter of the leg of the U within it being not less than 2.5 nor more than 5.0.

9. An oscillation generator of constant frequency comprising a pair of multi-electrode tubes each having anode, cathode and grid electrodes, a circuit roughly tuned to a desired operating frequency and having inductance and capacity connected between the anode electrodes of said devices so that at the operating frequency the anodes fluctuate out of phase, a circuit connected from an intermediate point on said roughly tuned circuit to the cathodes of said devices, a U-shaped tube having substantially parallel linear legs, each leg being substantially a quarter wave length long at a desired operating frequency, a connection from the trough portion of said tube to the cathode electrodes of said devices, connections from the grid electrodes of said devices to points on said U-shaped tube on opposite sides of said trough cathode connection, and a grounded metallic linear cylinder disposed about each of the linear legs of said U-shaped tube, the ratio of the inside diameter of each cylinder to the outside diameter of the leg of the U within it being 3.6.

10. A system for generating constant frequency oscillations comprising a pair of multi-electrode devices each having anode, cathode and grid electrodes, a circuit having inductance and capacity and roughly tuned to a desired operating frequency connected between said anode electrodes, a circuit connected to an intermediate point on said roughly tuned circuit and to the cathode electrodes of said devices, a flattened metallic tubular ellipse having substantially straight parallel sides and an over-all effective electrical length substantially equal to a multiple of half the length of the fundamental wave, a connection from said cathode electrodes to one of the troughs of said ellipse, and connections from said grid electrodes to points symmetrically disposed on said tubular ellipse on opposite sides of said trough cathode connection.

11. Apparatus as claimed in claim 10 characterized by the fact that about each of the straight sides of said tubular ellipse there is insulatingly arranged a grounded metallic cylinder.

12. The method of operating a regenerative oscillation generator so as to reduce loss at high frequencies which includes the step of adjusting the phase of feed back so that the grid potential leads the plate potential at the desired operating frequency.

13. An electron discharge device oscillator comprising input and output circuits, and a concentric resonant frequency control transmission line comprised of inner and outer substantially straight conductors having uniformly distributed inductance and capacitance and having an overall length equal to a multiple of one quarter of the operating wave length coupled to one of said circuits, a connection from the outer conductor of said line to ground, and means for producing standing waves on said line whereby the potentials of the standing waves thereon are applied to said oscillator in such phase relationship as to pull the oscillator into step with the standing waves, the ratio of the inside diameter of the outer conductor to the outside diameter of the inner conductor being substantially 4.68.

14. An oscillation generator comprising a multi-electrode device having anode, cathode and grid electrodes, a circuit having inductance and capacity roughly tuned to a desired frequency of operation coupled to said anode and cathode electrodes, and an accurate frequency controlling circuit coupled to said grid and cathode electrodes, said accurate frequency controlling circuit comprising a pair of linear tubes one within another, the ratio of the inside diameter of the outer tube to the outer diameter of the inner tube being substantially 1.65, each of said tubes being substantially a multiple of one quarter wave length at a desired operating frequency.

15. An electron discharge device oscillator comprising input and output circuits, and a concentric resonant frequency control transmission line comprised of inner and outer substantially straight conductors having substantially uniformly distributed inductance and capacitance and having an overall length equal to a multiple of one quarter of the operating wave length coupled to one of said circuits, a connection from the outer conductor of said line to ground, and means for producing standing waves on said line whereby the potentials of the standing waves thereon are applied to said oscillator in such phase relationship as to pull the oscillator into step with the standing waves, the ratio of the inside diameter of the outer tube to the outer diameter of the inner tube being substantially 2.72.

16. A low loss resonant line comprising inner and outer tubular conductors, means capacitively coupling said conductors together, and means controlling said first means for maintaining the effective electrical length of said line substantially constant despite temperature fluctuations.

17. A low loss resonant line circuit comprising inner and outer U-shaped, concentrically arranged conductors, means for electrically coupling said conductors together, said inner conductor being comprised of a material having a low temperature coefficient of expansion for maintaining the effective electrical length of said line substantially constant despite temperature fluctuations, and an electron discharge device having one of its electrodes coupled to said inner conductor at a point intermediate its ends, and another electrode coupled to said outer conductor.

18. An electron discharge device oscillator having a cathode, anode and control electrode, a resonant frequency control line comprised of inner and outer straight conductors, an electrical connection from said cathode to said inner and outer conductors, said inner conductor having an effective overall electrical length from the point of junction to said cathode to the end thereof substantially an odd multiple of a quarter wave length of the fundamental wave, a connection from said control electrode to a point on said inner conductor relatively near the point of connection of said inner conductor to said cathode, and an output circuit between said anode and cathode.

19. A low loss resonant line comprising inner and outer concentric conductors resonant to a predetermined frequency, a frequency determining element coupled to said inner and outer conductors, and means responsive to changes in length of said inner conductor due to variations in temperature for controlling said element so as to compensate for said changes in length of said inner conductor whereby the resonant frequency of said line is maintained substantially constant.

20. A low loss resonant line comprising inner and outer concentric conductors resonant to a predetermined frequency, a connection from said outer conductor to ground, and a variable capacity plate coupling said inner conductor and ground, and means responsive to changes in length of said inner conductor due to variations in temperature for controlling movement of said plate for varying the effective capacity to ground of said inner conductor, whereby the resonant frequency of said line is maintained substantially constant.

21. An oscillation generator system comprising a low loss frequency control line having a length substantially equal to an odd multiple of half the operating wave, said line having inner and outer conductors, and a pair of electron discharge devices having cathodes and grids, said cathodes being connected effectively to the electrical center of said line, and said grids being connected to said inner conductor of said line at points symmetrically located with respect to and relatively near the electrical center of said line.

22. In combination, a resonant line having a length substantially equal to an odd multiple of half the operating wave and open at both ends, a pair of electron discharge devices each having a grid and a cathode electrode, said cathodes being connected effectively to the center of said line, and connections from said grids to points on said line oppositely disposed with respect to and relatively near the center of said line.

23. An electron discharge device oscillator having a cathode, anode and control electrode, a frequency stabilizing circuit comprising a resonant line substantially equal to a quarter wave length which is open at at least one end thereof, connections from said cathode and control electrode to points on said line relatively near each other with respect to the length of said line, and an output circuit coupled between said anode and cathode.

24. In combination, a tuned resonant line system comprising inner and outer U-shaped, concentric conductors, said inner conductor having a low temperature coefficient of linear expansion and comprising an iron-nickel alloy, and an electron discharge device having its control electrode coupled to said inner conductor at a point intermediate its ends and its cathode coupled to said outer conductor.

25. In combination, a tuned circuit comprising inner and outer U-shaped, concentric conductors, said inner conductor having a low temperature coefficient of linear expansion and comprising an iron-nickel alloy coated with a material having low resistance to the flow of high frequency electrical energy and an electron discharge device having its control electrode coupled to said inner conductor at a point intermediate its ends and its cathode coupled to said outer conductor.

26. In combination, a tuned resonant line circuit comprising inner and outer U-shaped, concentric conductors, said inner conductor having a low temperature coefficient of linear expansion and comprising an iron-nickel alloy, a connection from said outer conductor to a point of zero radio frequency potential, and an electron discharge device having its control electrode coupled to said inner conductor at a point intermediate its ends, and its cathode coupled to a point of zero radio frequency potential.

27. In combination, a tuned resonant line circuit comprising inner and outer U-shaped, concentric conductors, said inner conductor having a low temperature coefficient of linear expansion and comprising an iron-nickel alloy, and an electron discharge device having one of its electrodes coupled to said inner conductor at a point intermediate its ends and another electrode coupled to said outer conductor.

28. An oscillation generator system comprising a low loss frequency control line comprising an inner conductor and a concentric outer conductor extending over the entire length of said inner conductor, said inner conductor having a length substantially equal to an odd multiple of half the operating wave, a connection from said outer conductor to a point of zero radio frequency potential, and a pair of electron discharge devices having corresponding electrodes coupled to said inner conductor at points intermediate the ends thereof and symmetrically located with respect to the electrical center thereof.

29. In combination, a tuned resonant line circuit comprising inner and outer concentric conductors, said inner conductor having a low temperature coefficient of linear expansion and comprising an iron-nickel alloy, and an electron discharge device having one of its electrodes coupled to said inner conductor at a point intermediate its ends and another electrode coupled to said outer conductor.

30. In combination, a tuned resonant line circuit comprising inner and outer concentric conductors, said inner conductor being made of a material having a low temperature coefficient of expansion coated with a material having a low resistance to the flow of high frequency currents, and an electron discharge device having one of its electrodes coupled to said inner conductor at a point intermediate its ends and another electrode coupled to said outer conductor.

31. In combination, a tuned resonant line circuit comprising an inner conductor and an outer coaxial conductor, said inner conductor being made of a material having a low temperature coefficient of expansion coated with a material having low resistance to the flow of high frequency currents, and an electron discharge device having a pair of its electrodes coupled to said inner conductor over an appreciable portion of the length of said inner conductor.

32. An oscillation generator system comprising a low loss frequency control line comprising an inner conductor and a concentric outer conductor extending over the entire length of said inner conductor, said inner conductor having a length substantially equal to an odd multiple of half the operating wave, a connection from said outer conductor to a point of zero radio frequency potential, and a pair of electron discharge devices having corresponding electrodes coupled to said inner conductor over portions intermediate the ends thereof and symmetrically located with respect to the electrical center thereof.

33. An oscillation generator system comprising a low loss frequency control line comprising an inner conductor and a concentric outer conductor extending over the entire length of said inner conductor, said inner conductor having a length substantially equal to an odd multiple of half the operating wave, a connection from said outer conductor to a point of zero radio frequency potential, and a pair of electron discharge devices having corresponding electrodes coupled to said inner conductor at points intermediate the ends thereof and on opposite sides of the center of said line.

CLARENCE W. HANSELL.